United States Patent
Falkenberg

(10) Patent No.: US 9,303,620 B2
(45) Date of Patent: Apr. 5, 2016

(54) INSTALLATION/DISMOUNTING OF A HUB TO/FROM A NACELLE OF A WIND TURBINE BY USING A BLADE PITCH ANGLE ADJUSTMENT DEVICE OF THE HUB FOR ORIENTATING THE HUB

(71) Applicant: Peter Loevenskjold Falkenberg, Herning (DK)

(72) Inventor: Peter Loevenskjold Falkenberg, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 298 days.

(21) Appl. No.: 13/859,018

(22) Filed: Apr. 9, 2013

(65) Prior Publication Data
US 2013/0269188 A1 Oct. 17, 2013

(30) Foreign Application Priority Data
Apr. 16, 2012 (EP) ..................................... 12164297

(51) Int. Cl.
*F03D 1/00* (2006.01)
*F03D 7/02* (2006.01)
*B66C 1/10* (2006.01)

(52) U.S. Cl.
CPC ................ *F03D 1/001* (2013.01); *B66C 1/108* (2013.01); *F03D 7/0224* (2013.01); *F05B 2230/60* (2013.01); *F05B 2230/70* (2013.01); *Y02E 10/728* (2013.01); *Y02P 70/523* (2015.11); *Y10T 29/49316* (2015.01); *Y10T 29/49318* (2015.01)

(58) Field of Classification Search
CPC ....... F03D 1/001; F03D 7/0224; B66C 1/108; Y10T 29/49316; Y10T 29/49318; F05B 2230/60; F05B 2230/70
See application file for complete search history.

(56) References Cited

U.S. PATENT DOCUMENTS

2009/0159549 A1 6/2009 Trede et al.
2009/0324380 A1* 12/2009 Pedersen ....................... 414/800
2013/0074335 A1* 3/2013 Amano ........................... 29/889

FOREIGN PATENT DOCUMENTS

| CN | 201424334 Y | 3/2010 |
| EP | 2118483 A2 | 11/2009 |
| WO | WO 2011063815 A | 6/2011 |

* cited by examiner

Primary Examiner — Moshe Wilensky

(57) ABSTRACT

Disclosed is a holding device for holding a hub to be installed at a nacelle. The holding device includes a carrier element with a first connection interface configured to connect the holding device to a lifting system, and a second connection interface configured to connect the device to a blade pitch bearing of the hub. Further disclosed is a pitch operating device for operating a blade pitch angle adjustment device of a hub to be mounted to a nacelle. The pitch operating device includes an actuating unit and a power interface for connecting the pitch operating device to the blade pitch angle adjustment device. Further disclosed is a hub installation system including such a holding device and such a pitch operating device. Further, a method for installing a hub at a nacelle and a method for dismounting a hub from a nacelle are described.

4 Claims, 4 Drawing Sheets

US 9,303,620 B2

INSTALLATION/DISMOUNTING OF A HUB TO/FROM A NACELLE OF A WIND TURBINE BY USING A BLADE PITCH ANGLE ADJUSTMENT DEVICE OF THE HUB FOR ORIENTATING THE HUB

CROSS REFERENCE TO RELATED APPLICATIONS

The present application claims priority to European Patent Office application No. 12164297.9 filed Apr. 16, 2012, the entire content of which is hereby incorporated herein by reference.

FIELD OF INVENTION

The present invention generally relates to the technical field of installing and/or dismounting components to respectively from a wind turbine. In particular, the present invention relates to an installation and/or a dismounting procedure of a hub to and/or from a nacelle of a wind turbine. Specifically, with the present invention there are described (a) a holding device for holding a hub to be installed at a nacelle of a wind turbine, (b) a pitch operating device for operating a blade pitch angle adjustment device of a hub which is dismounted from a nacelle of a wind turbine and (c) a hub installation system comprising such a holding device and such a pitch operating device. Further, with the present invention there are described (d) a method for installing a hub at a nacelle of a wind turbine and (e) a method for dismounting a hub from a nacelle of a wind turbine.

ART BACKGROUND

When erecting a modern wind turbine it is necessary to lift several heavy wind turbine components to a height being given by the height of a tower of the wind turbine. The respective lifting procedures are typically carried out with special heavy load cranes which may be external cranes or internal (so called built in) cranes. Specifically, after having erected the tower of the wind turbine a nacelle has to be placed on a yaw bearing which is arranged at the top of the tower. Within or at the nacelle there have to be placed in particular an electric generator and in some cases also a main shaft. After having installed the nacelle together with the electric generator and in some cases also the main shaft a hub has to be lifted up and installed to a front end of the electric generator or the main shaft.

For installing the hub firstly the hub has to be lifted up and secondly the hub has to be rotated from a horizontal orientation into a proper at least approximately vertical orientation which allows the hub to be attached to the at least approximately horizontal electric generator or main shaft. Typically, for lifting up the hub a first crane is used and for rotating the hub a second crane with a wire attached to the hub is used. The second crane is used predominantly to control the exact orientation angle of the hub.

EP 2 118 483 B1 discloses a handling unit for moving a wind turbine hub from a transportation position to a wind turbine assembly position. The disclosed handling unit comprises (a) at least one connection point for connection to a wire of a crane system, (b) attachment means for attachment of the handling unit to a structural part of the wind turbine component and (c) an actuating means for actuating the wind turbine component around a rotational center of the handling unit in order to perform a rotation of the (wind turbine) hub. This handling unit has the disadvantage that heavy and from a mechanical point of view relatively complex actuating means are necessary in order to grip the hub in a reliable manner. This causes that the procedure of installing a hub to a nacelle of a wind turbine and also the procedure of dismounting a hub from a nacelle of a wind turbine are at least from a mechanical point of view relatively complex.

There may be a need for facilitating the procedure of installing a hub to a nacelle of a wind turbine and the procedure of dismounting a hub from a nacelle of a wind turbine.

SUMMARY OF THE INVENTION

This need may be met by the subject matter according to the independent claims. Advantageous embodiments of the present invention are described by the dependent claims.

According to a first aspect of the invention there is provided a holding device for holding a hub to be installed at a nacelle of a wind turbine. The provided holding device comprises (a) a carrier element having a first end and a second end, (b) a first connection interface being arranged at the first end and being configured to connect the holding device to a lifting system, and (c) a second connection interface being arranged at the second end and being configured to connect the holding device to a blade pitch bearing of the hub.

The described holding device is based on the idea that a hub can be installed at a nacelle of a wind turbine and in particular at an electric generator or a main shaft of a nacelle of a wind turbine by temporarily mounting the carrier element via the second connection interface to a pitch bearing of the hub. This allows for rotating the hub during a lifting procedure wherein the hub is lifted up e.g. from ground to the nacelle by means of a lifting system. Thereby, within the coordinate system of the hub the rotational axis corresponds to an axis which during a normal operation of the wind turbine is assigned to changes of a blade pitch angle of a rotor blade of the wind turbine. The rotation may comprise a pivoting with a defined rotation or pivoting angle such that when the hub arrives at the height of the nacelle the hub is oriented in such a manner that the hub can be installed to the main shaft or the electric generator. Specifically, the hub can be oriented in such a manner that its main rotational axis is aligned with the electric generator or main shaft (of the nacelle) of the wind turbine.

The mentioned lifting system may be any system which is capable of lifting the holding device together with a hub being attached to the second connection interface. The can be a crane comprising a load element such as a crane hook. The crane may be an external crane or a dedicated crane which is assigned to a wind turbine nacelle. In particular in remote wind turbine erections sites such as an open water environment the lifting system may be installed at a boat or may be realized by a helicopter being equipped with an appropriate winch.

The carrier element may be any mechanical structure which is stable enough in order to be able to hold the weight of the hub to be installed. Preferably, the carrier element is made from a metal beam which is strong enough on order to safely carry the entire weight of the hub.

The first connection interface may be any mechanical structure which is also stable enough in order to sustain at least the total weight of the hub plus the weight of the holding device. The first connection interface may be for instance a structure, which is capable of engaging with a load hook of a crane.

The second connection interface is configured in such a manner that the second end of the holding device can be temporarily attached to one of the blade pitch bearings of the hub. This means that the structural design of the second interface may in particular correspond to the structural design of a blade root which during a complete wind turbine installation process is mounted to the hub after the hub has been mounted to the nacelle or to a main rotor axis of the wind turbine.

The described holding device may provide the advantage that it can be realized without any movable parts. In particular a (pneumatic and/or hydraulic) gripping mechanism is not necessary for temporarily attaching the hub to the holding device. Specifically, for attaching the second connection interface to the blade pitch bearing of the hub usual connection elements such as screws and/or bolts can be used.

It is pointed out that the described holding device can also be used for dismounting a hub from a nacelle. In particular, the described holding device can be used for lowering a hub which has just been disconnected from (an electric generator or a main shaft of) a nacelle to ground or onto a transportation device which is used for transporting the hub to another place.

According to an embodiment of the invention the carrier element comprises a curved structure. This may provide the advantage that when the holding device is lifted by the lifting system and the hub is suspended at the holding device the second interface can engage with the hub from a lateral side. This may allows both for an easy mounting of the hub to the carrier element and for an easy rotation of the hub during the above mentioned lifting procedure.

According to a further embodiment of the invention the curved structure of the carrier element is configured in such a manner that when the hub is mounted to the holding device and the holding device is carried by the lifting system such that the hub is suspended in air, the center of gravity of the hub is located on an axis being defined by the direction of a tension force within the lifting system. This may provide the advantage that because of an at least partial a balance of weight a rotation of the hub during the above mentioned lifting procedure can be realized with only weak external forces.

The described axis may be in particular a vertical axis being defined by the gravitational force. Further, the described axis may be defined by the longitudinal extension of a cable or a rope of the lifting system.

According to a further aspect of the invention there is described a pitch operating device for operating a blade pitch angle adjustment device of a hub which is dismounted from a nacelle of a wind turbine. The described pitch operating device comprises (a) an actuating unit and (b) a power interface for connecting the pitch operating device to the blade pitch angle adjustment device, wherein the power interface is configured for transferring energy being provided by the actuating unit to the blade pitch angle adjustment device in order to activate the blade pitch angle adjustment device.

The described pitch operating device is based on the idea that for installing a hub to (an electric generator or a main shaft of) a nacelle it may be advantageous to active the blade pitch angle adjustment device being built in the hub. Since when installing a hub the rotor blades are not yet mounted, the blade pitch bearing can be used for carrying or holding the hub in particular by using the above described holding device. When operating or activating the blade pitch angle adjustment device of a hub being carried or held at its blade pitch bearing the hub will rotate around an axis of the blade pitch bearing. This allows to adjust the angular position of the hub such that an orientation of the hub can be established which allows for an easy mounting of the hub to the nacelle. Thereby, rotating the hub can be carried out during the hub is lifted into the height of the nacelle.

In this respect it is mentioned that the described pitch operating device can also be used for a hub which is supposed to be dismounted from a nacelle of a wind turbine. In this case the hub may be rotated during a lowering of the hub from the height of the nacelle to ground or to a transportation device for the hub. Thereby, it can be ensured that the hub reaches the ground or the transportation device with a proper angular orientation which allows for an easy and secure storage, transportation or handling of the hub.

The power interface may be any interface which allows for transferring energy from the pitch operating device to the blade pitch angle adjustment device of the hub. Thereby, depending on the type of pitch operating device the power interface is configured such that the (type of) energy being required for activating the blade pitch angle adjustment device can be transferred. Specifically, when the blade pitch angle adjustment device is a hydraulic system, the power interface comprises the necessary connection means which allow for transferring hydraulic fluid. If the blade pitch angle adjustment device comprises an electric motor the power interface comprises electric connectors which allow for transferring the necessary electric energy to the blade pitch angle adjustment device.

Descriptive speaking, the described pitch operating device may comprise hydraulic and/or electric actuators such as e.g. one or more hydraulic cylinders and/or one or more electric motors which may be provided with at least one gear being connectable to the blade pitch angle adjustment device. By means of the one or more gears the force for driving the blade pitch angle adjustment device can be transferred from the actuating unit to the blade pitch angle adjustment device.

In order to facilitate for an operating person the handling of the pitch operating device may be configured in such a manner that it can be controlled by means of a remote control.

According to a further embodiment of the invention the pitch operating device further comprises an energy source, which is connected to the actuating unit and which is configured for providing energy being used by the actuating unit. This may provide the advantage that the pitch operating device can be realized as an autarkic or self-sustaining unit which can be used also in places where there is no power supply available.

The energy source may be e.g. a battery, a combustion engine with a tank being filled with a sufficient amount of fuel and/or an electric generator being operable with such a combustion machine.

According to a further aspect of the invention there is provided a hub installation system for installing a hub at a nacelle of a wind turbine. The provided hub installation system comprises (a) a holding device as described above and (b) a pitch operating device as described above.

Also the described hub installation system is based on the idea that an efficient hub installation (and also hub dismounting) procedure can be realized (a) by using the blade pitch bearing of the hub for mechanically carrying the hub by means of the described holding device with the result that a rotation of the hub is possible at the same time the hub is held by the holding device and (b) by using the described pitch operating device for activating the blade pitch angle adjustment device of the hub. In this case the blade pitch angle adjustment device is not used for changing the blade pitch angle of a rotor blade been mounted to the hub but for rotating the hub into a proper angular position which allows for an easy mounting of the hub to (an electric generator of a main shaft of) a nacelle.

When using the described hub installation system the built in blade pitch angle adjustment device, which is normally used for rotating a rotor blade towards a desired blade pitch angle, is here used for turning the hub when the hub is carried by the holding device. This is a very simple and cheap hub installation solution because the blade pitch angle adjustment device, which is anyway existent in the hub, can also be used for setting a proper hub orientation. With the described hub installation system it is easy to precisely turn the hub from one angular orientation to another angular orientation simply by using the built in blade pitch angle adjustment device of the hub.

According to a further aspect of the invention there is provided a method for installing a hub at a nacelle of a wind turbine. The provided installation method comprises (a) attaching a holding device, in particular a holding device as described above, to a blade pitch bearing of the hub, (b) attaching a lifting system to the holding device, (c) connecting a pitch operating device, in particular a pitch operating device as described above, to a blade pitch angle adjustment device of the hub, (d) lifting the holding device together with the attached hub to the height of the nacelle, (e) changing the orientation of the hub by activating the blade pitch angle adjustment device by means of the pitch operating device, and (f) installing the hub to the nacelle.

Also the described hub installation method is based on the idea that an efficient installation of a hub to (an electric generator or a main shaft of) a nacelle of a wind turbine can be realized (a) by using the blade pitch bearing of the hub for mechanically carrying the hub which allows for rotating the hub at the same time the hub is held by the holding device and (b) by using the pitch operating device for activating the blade pitch angle adjustment device of the hub. Thereby, by contrast to a normal operation of the wind turbine wherein the blade pitch angle adjustment device is used for changing the blade pitch angle of a rotor blade here the blade pitch angle adjustment device is used for rotating the hub into a proper angular position which allows for an easy mounting of the hub to (the electric generator or the main shaft of) the nacelle.

By activating the blade pitch angle adjustment device the hub may be turned or rotated from one angular position to another angular position. Specifically, the hub may be turned or rotated from a horizontal orientation (which is used for storing of transporting the hub) to an at least approximately vertical orientation (which is the position with which the hub is attached to the main shaft or electric generator). Preferably, the at least approximately vertical orientation is a vertical orientation minus a predefined inclination angle of the nacelle.

Descriptive speaking, when the hub is lifted upwards at the same time the angular position of the hub is changed such that at the end the hub will be oriented in such a manner that an easy attachment of the hub to the main shaft or electric generator of (the nacelle of) the wind turbine can be accomplished. The wind turbine may be a direct drive (DD) wind turbine where e.g. the main shaft is directly connected to an electric generator without using a gear being connected between the main shaft and the electric generator or e.g. preferably where there is no main shaft connected to the electric generator but just a structure and one or more bearings for carrying the electric generator. For a DD wind turbine the described method is in particular advantageous because a DD wind turbine has no drive train which could be used for supporting a rotational movement of the main shaft in order to bring the main shaft into a proper angular position with respect to the hub. Therefore, when installing the hub to a DD wind turbine there is, by contrast to known installation procedures, no need for temporarily installing (in a time consuming process) additional equipment for turning the main shaft into a proper angular position before the hub can be mounted.

According to a further embodiment of the invention the installation method further comprises (a) detaching the holding device from the blade pitch bearing, and (b) lowering the holding device to ground. This may provide the advantage that the holding device can later be (re)used for an installation procedure of a further hub to a further nacelle.

According to a further aspect of the invention there is provided a method for dismounting a hub from a nacelle of a wind turbine. The provided dismounting method comprises (a) attaching a holding device, in particular a holding device as described above, to a blade pitch bearing of the hub, (b) attaching a lifting system to the holding device, (c) connecting a pitch operating device, in particular a pitch operating device as described above, to a blade pitch angle adjustment device of the hub, (d) lowering the holding device together with the attached hub from the height of the nacelle, (e) changing the orientation of the hub by activating the blade pitch angle adjustment device by means of the pitch operating device, and (f) placing the hub onto a support.

The described hub dismounting method is based on the idea that also an efficient removal of a hub from (an electric generator or a main shaft of) a nacelle of a wind turbine can be realized (a) by using the blade pitch bearing of the hub for mechanically carrying the hub during lowering the hub from the height of the nacelle which allows for rotating the hub at the same time the hub is held by the holding device and (b) by using the pitch operating device for activating the blade pitch angle adjustment device of the hub. Thereby, the blade pitch angle adjustment device is used for rotating the hub into a proper angular position which allows for a stable support of the dismounted hub by or onto the support.

The support may be any physical structure which allows for a stable and safe accommodation of the dismounted hub. Preferably, the support may be assigned to a transportation device such as a rail car, a truck or a boat, which may be used to transport the dismounted hub to a place where e.g. maintenance and/or repair work is done.

According to a further embodiment of the invention the dismounting method further comprises detaching the holding device from the blade pitch bearing. This may provide the advantage that the holding device can be later (re)used for an installation procedure and/or for a further dismounting procedure of a further hub.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
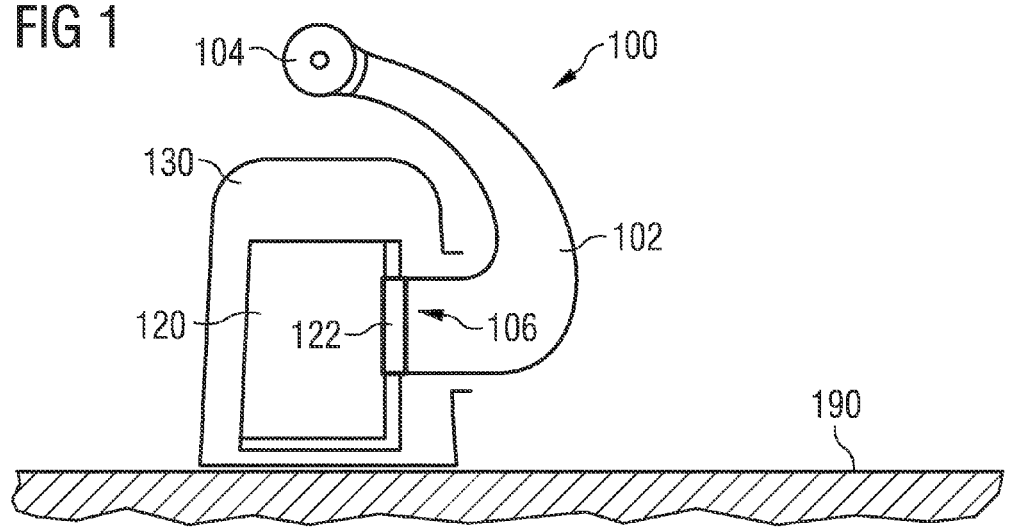
FIG. 1 shows in accordance with the invention a holding device being connected to a hub to be installed at a nacelle of a wind turbine, wherein the hub is located at ground.

The illustration in the drawing is schematically. It is noted that in different figures, similar or identical elements are provided with the same reference signs or with reference signs, which are different from the corresponding reference signs only within the first digit.

FIG. 1 shows a holding device 100 being connected to a hub 120 to be installed at a non depicted nacelle of a non depicted wind turbine. In the operational state shown in FIG. 1 the hub 120 is located at ground 190.

The holding device 100 comprises a carrier element 102 having a first end and a second end. According to the embodiment described here the carrier element 102 is a lifting arm comprising a curved shape. At the first end there is formed a first connection interface 104 for mechanically connecting the holding device 100 to a lifting system which is not depicted in FIG. 1. According to the embodiment described here the first connection interface is a simple ring 104 which can engage to a not depicted load hook of the not depicted lifting system.

At the second end of the lifting arm 102 there is formed a second connection interface 106, which has a 3D geometry corresponding to the 3D geometry of a root of a blade which is at a later stage supposed to be mounted to the blade pitch bearing 122 of the hub 120. This structural shape of the second connection interface 106 allows the holding device 100 to be attached to the blade pitch bearing 122. This operational state is shown in FIG. 1.

In FIG. 1 there is depicted with reference numeral 130 a spinner surrounding the hub 120. It is mentioned that it is not necessary to form a special cavity in the spinner 130 for allowing the second connection interface 106 to be inserted into the blade pitch bearing 122 because the lifting arm 102 is attached to the hub 120 in the same way as a wind turbine blade which will be attached to the hub 120 later.

Figure 2:
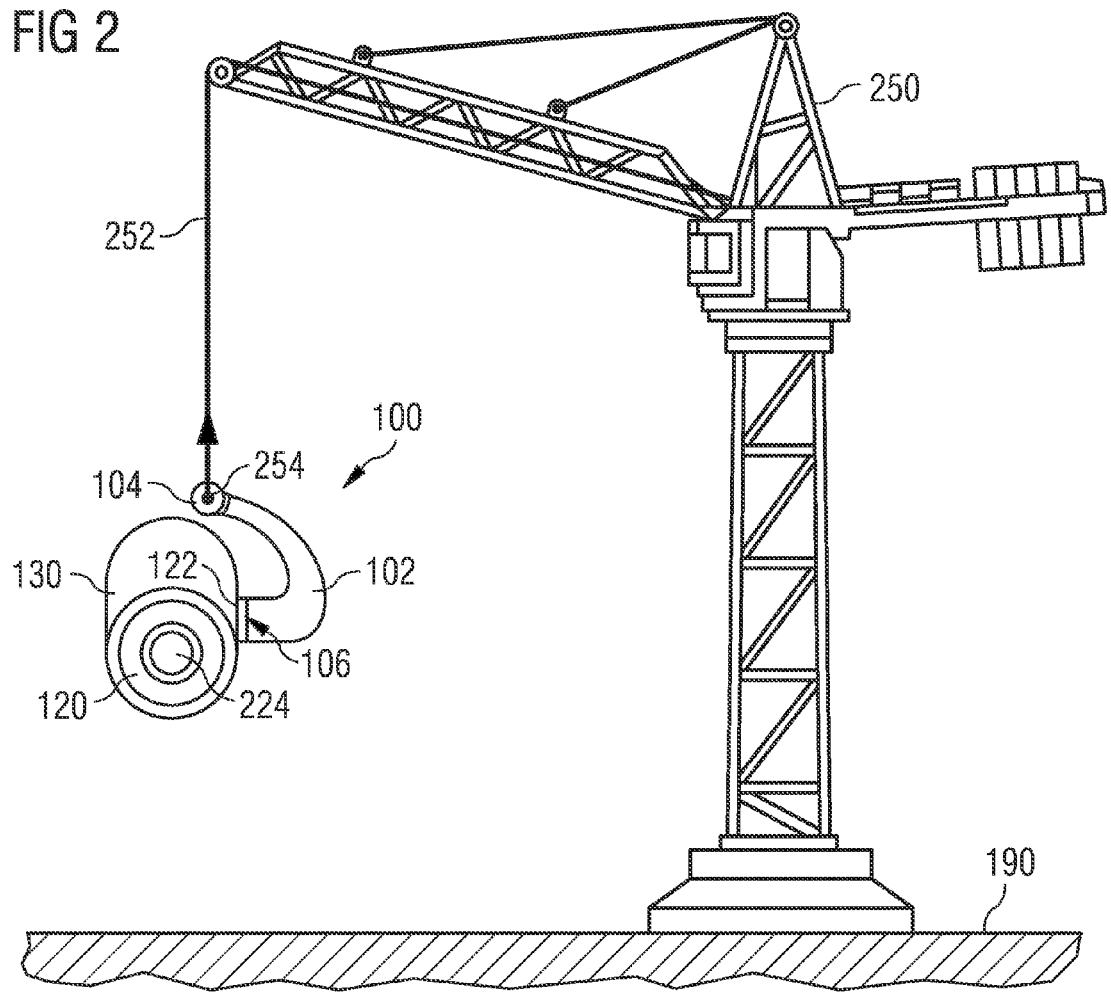
FIG. 2 shows the hub shown in FIG. 1, wherein the hub is carried by the holding device which itself has been lifted by means of a crane.

FIG. 2 shows the hub 120 which has been elevated above ground 190. Thereby, a lifting system 250, which according to the embodiment described here is a crane 250, has been lifted the holding device 100 being mounted to the blade pitch bearing 122. The crane 250 comprises a wire 252 and a load hook 254 which according to the embodiment described here engages into the ring 104.

As can be seen from FIG. 2, the hub 120, which comprises a holding fixture 224 for an electric generator or a main shaft of the wind turbine, has not only been lifted but has also been rotated around an axis being defined by the blade pitch bearing 122. This rotation has been caused by activating a non depicted blade pitch angle adjustment device of the hub 120. The blade pitch angle adjustment device engages with the second connection interface such that when activating the second connection interface the hub rotates in relation to the holding device 100 which with respect to the rotational movement of the hub 120 can be considered as to be stationary.

It is mentioned that in order to be able to conveniently install the hub to a main axis of a nacelle of a wind turbine with respect to orientation of the hub shown in FIG. 2 the rotational movement should continue until the holding fixture 224 is aligned with the direction of the electric generator or main shaft.

FIGS. 3 to 8 illustrate a installation of a hub 320 to a nacelle 870 of a wind turbine, wherein a holding device 400 being connectable to a blade pitch bearing 322 of the hub 320 is used for carrying the hub 320 and a pitch operating device 560 in connection with a blade pitch angle adjustment device 526 of the hub 320 is used for rotating the hub 320 into a proper orientation.

Figure 3:
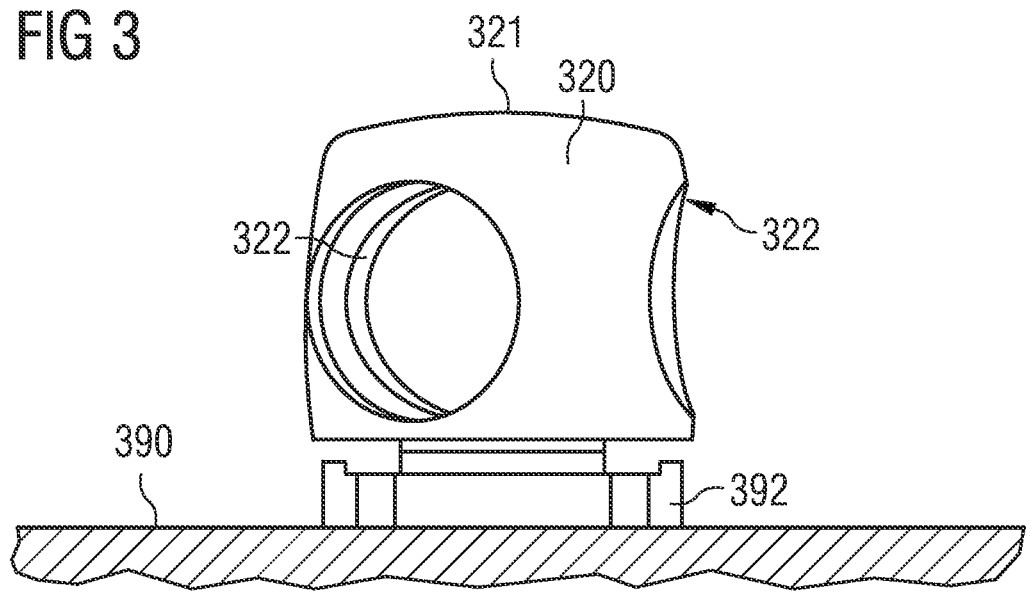
FIGS. 3 to 8 illustrate a installation of a hub to a nacelle of a wind turbine, wherein a holding device being connectable to a blade pitch bearing of the hub is used for carrying the hub and a pitch operating device in connection with a blade pitch angle adjustment device of the hub is used for rotating the hub into a proper orientation.

Initially, as shown in FIG. 3, the hub 320 is located on a support structure 392 in an orientation, wherein a nose cone of the hub is pointing vertically upwards. This orientation of the hub 320 typically corresponds to a transport orientation in which the hub 320 is transported e.g. by means of a rail car, a truck or a boat. The support structure 392 is situated above a ground 390.

According to the embodiment described here the hub 320 comprises three blade pitch bearings 322. In the perspective shown in FIG. 3 there is clearly shown only one of these three blade pitch bearings 322.

Figure 4:
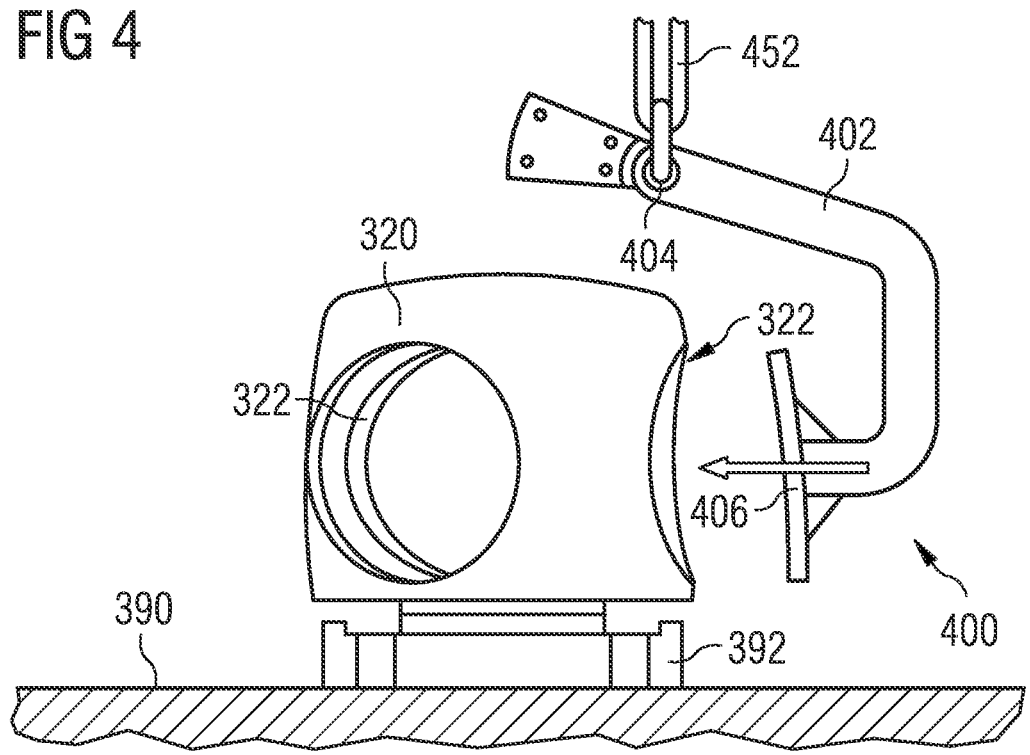

As can be seen from FIG. 4, the lifting and rotating procedure for the hub 320 described here starts with attaching the holding device 400 to one of the three blade pitch bearings 322. Thereby, a second connection interface 406 is inserted into the respective blade pitch bearing 322 along the arrow shown in FIG. 4. Since the holding device 400 is a heavy component, during this insertion process the holding device 400 is carried by a lifting system such as a crane, which lifting system comprises a wire 452 being fastened to a first connection interface 404 being formed at one end of a carrier element/lifting arm 402 of the holding device 400.

Figure 5:
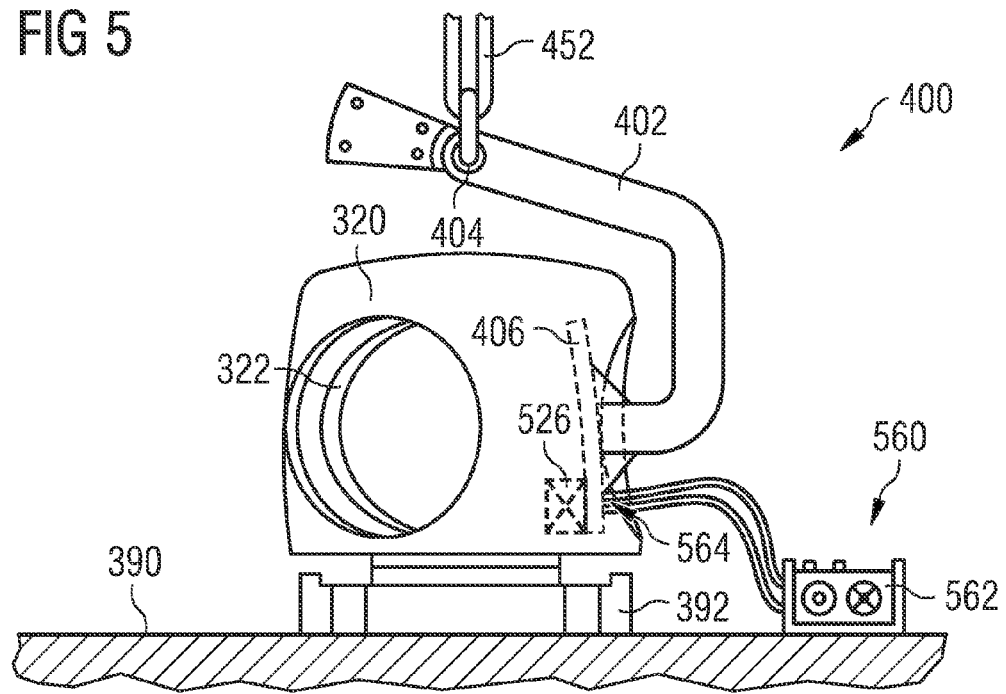

In a further step illustrated in FIG. 5, the above mentioned pitch operating device 560 is operatively connected to the blade pitch angle adjustment device 526 of the hub 320. The pitch operating device 560 comprises an actuating unit 562 and a power interface 564 for transferring energy being provided by the actuating unit 562 to the blade pitch angle adjustment device 526 in order to activate the blade pitch angle adjustment device 526.

According to the embodiment described here the pitch operating device 560 is an autarkic unit which can be used also in places where there is no power supply available. This can be realized by means of a not depicted energy source which provides the energy being necessary for driving the blade pitch angle adjustment device 526. The energy source may be e.g. a battery, a combustion engine with a tank being filled with a sufficient amount of fuel and/or an electric generator being operable with such a combustion machine.

According to the embodiment described here the blade pitch angle adjustment device 526 is operated with hydraulic pressure and the pitch operating device 560 is a corresponding hydraulic pressure unit. However, it is mentioned that if the blade pitch angle adjustment device 526 is directly driven by electric energy the pitch operating device 560 may be simply a corresponding electric unit.

Figure 6:
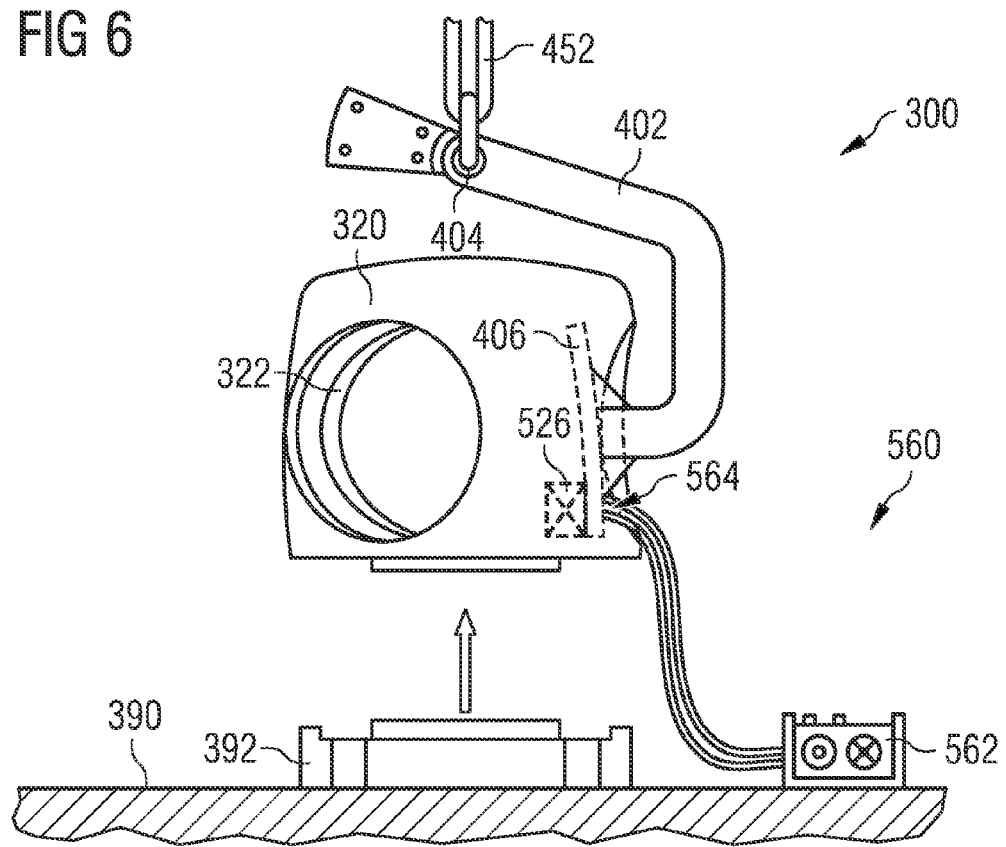

In FIG. 6 it is depicted how the hub 320 is lifted from ground 390. The lifting process is illustrated by a vertical arrow.

Figure 7:
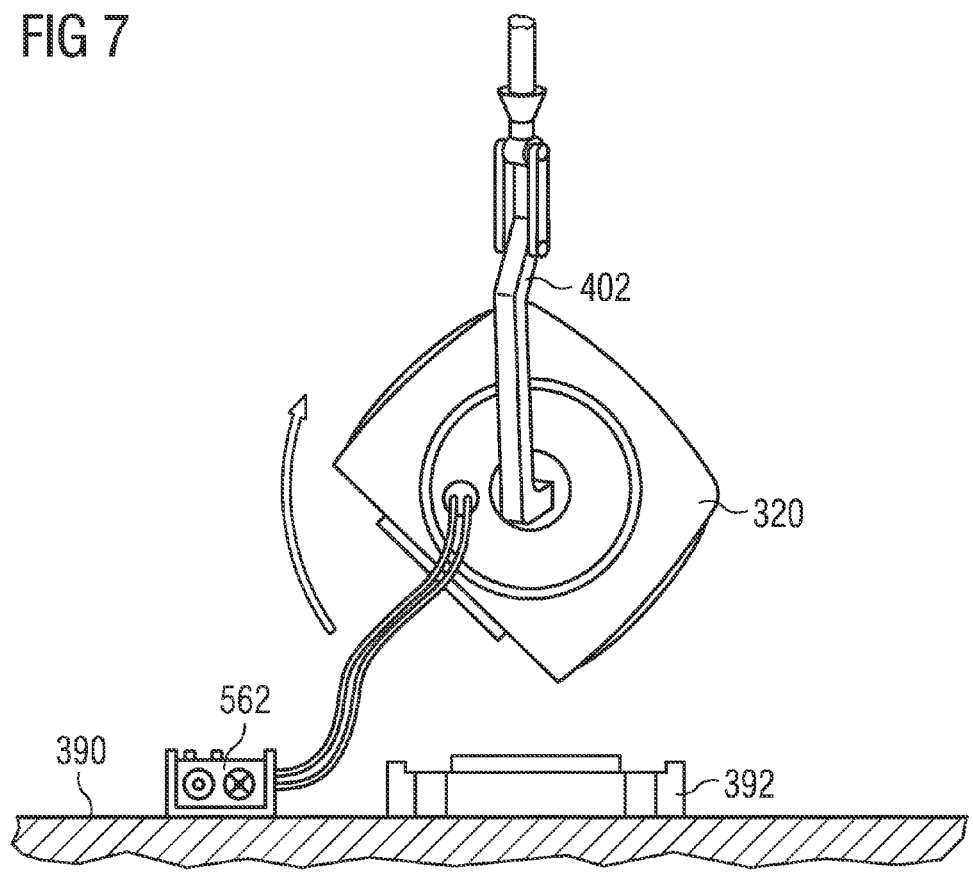

In FIG. 7 the rotation of the hub 320 being carried by the holding device 400 is illustrated. The rotation process is illustrated by a curved arrow. The load transmission in order to effect the rotation process is based on an engagement e.g. by means of at least one gear wheel. Thereby, the blade pitch angle adjustment device 526 cooperates with the non depicted second connection interface. Therefore, by activating the blade pitch angle adjustment device 526 by means of the pitch operating device 560 the hub 320 will rotate around an axis of the stationary holding device 400, whereby this axis is identical with a central axis of the blade pitch bearing 322.

After having completed the rotation process the pitch operating device 560 and in particular the power interface 564 of the pitch operating device 560 are disconnected from the blade pitch angle adjustment device 526.

Figure 8:
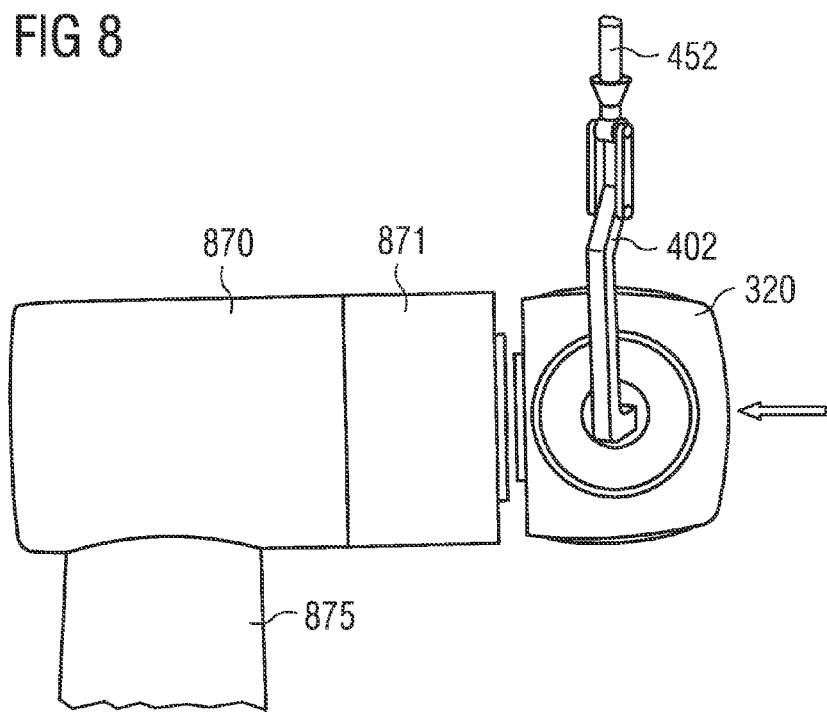

In FIG. 8 the installation of the properly oriented hub 320 to an electric generator 871 of the nacelle 870 is illustrated. After having completed this installation the holding device is detached from the blade pitch bearing 322 and is lowered to ground 390. This allows for reusing the holding device 400 for a further hub installation procedure.

It is mentioned that the holding device 100, 400 and the pitch operating device 560, which together form a hub installation system, can also be used for dismounting a hub from a nacelle and delivering the hub to ground or to a support structure in a proper angular orientation. A person skilled in the art will understand from the disclosure of this document how to use such a hub installation system also for the reverse procedure of dismounting a hub. Therefore, for the sake of conciseness of this document a detailed description of a possible dismounting procedure will be omitted.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A hub installation system for installing a hub at a nacelle of a wind turbine, the hub having a plurality of sockets for accepting turbine blades, each socket having a blade pitch bearing, and each blade pitch bearing having a predetermined 3D geometry that mates with a corresponding predetermined 3D geometry of a turbine blade root, the hub installation system comprising:
 a hub holding device to be installed at the nacelle of the wind turbine, the hub holding device comprising:
  a carrier element having a first end and a second end;
  a first connection interface arranged at the first end and configured to connect the hub holding device to a lifting system; and
  a second connection interface arranged at the second end having a 3D geometry corresponding to the predetermined 3D geometry of the turbine blade root designed to mate with the blade pitch bearings of the hub and
 a pitch operating device for operating a blade pitch angle adjustment device of the hub which is dismounted from the nacelle of the wind turbine, the pitch operating device comprising;
  an actuating unit; and
  a power interface for connecting the pitch operating device to the blade pitch angle adjustment device, wherein the power interface is configured for transferring energy being provided by the actuating unit to the blade pitch angle adjustment device in order to activate the blade pitch angle adjustment device while the hub is being carried or held prior to mounting of rotor blades.

2. The hub installation system as claimed in claim 1, wherein the carrier element comprises a curved structure.

3. The hub installation system as claimed in claim 2, wherein the curved structure of the carrier element is configured in such a manner that when the hub is mounted to the hub holding device and the hub holding device is carried by the lifting system such that the hub is suspended in air, the center of gravity of the hub is located on an axis being defined by the direction of a tension force within the lifting system.

4. The hub installation system as claimed in claim 1, the pitch operating device further comprising an energy source, which is connected to the actuating unit and which is configured for providing energy being used by the actuating unit.

* * * * *